G. E. ST. JOHN AND C. BOWMAN.
SPLIT PULLEY.
APPLICATION FILED SEPT. 2, 1919.

1,352,761.

Patented Sept. 14, 1920.

Inventors
George St. John & Clyde Bowman

Witness: H. P. Ireland.

Attorneys

UNITED STATES PATENT OFFICE.

GEORGE E. ST. JOHN AND CLYDE BOWMAN, OF HAMMOND, INDIANA.

SPLIT PULLEY.

1,352,761.   Specification of Letters Patent.   Patented Sept. 14, 1920.

Application filed September 2, 1919. Serial No. 321,111.

*To all whom it may concern:*

Be it known that we, GEORGE E. ST. JOHN and CLYDE BOWMAN, citizens of the United States, residing at Hammond, in the county of Lake and State of Indiana, have invented a certain new and useful Improvement in Split Pulleys, of which the following is a specification.

Our invention relates to split pulleys and is adapted to be put in place with the minimum of disturbance of associated parts. The particular form illustrated herewith is designed to replace the fan belt pulley of the Ford automobile. This pulley is mounted on the forward end of the crank shaft, and serves both as a driving medium for the fan belt and as a clutch member to be engaged by a part on the starting crank, whereby the motor is turned over.

In the form now in use with the Ford car the pulley has a tendency to become battered and deformed, so that it no longer runs true on the shaft, and throws off the fan belt and destroys it. To replace this part in the ordinary way requires the removal of the radiator and all the associated parts in front of the pulley. This is an expensive and troublesome operation, and it is one object of our invention to make it unnecessary. With our pulley none of these parts need be disturbed, and our pulley may be put in place or removed without in any way disturbing the parts with which it is associated.

Our invention is illustrated more or less diagrammatically in the accompanying drawings, wherein, Figure 1 is a side elevation of our pulley.

Like parts are indicated by like characters throughout.

Figure 4:
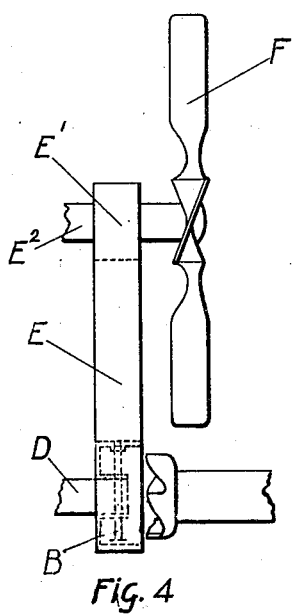
Fig. 4 is a diagrammatic showing of our pulley in place on an engine.
Figure 3:
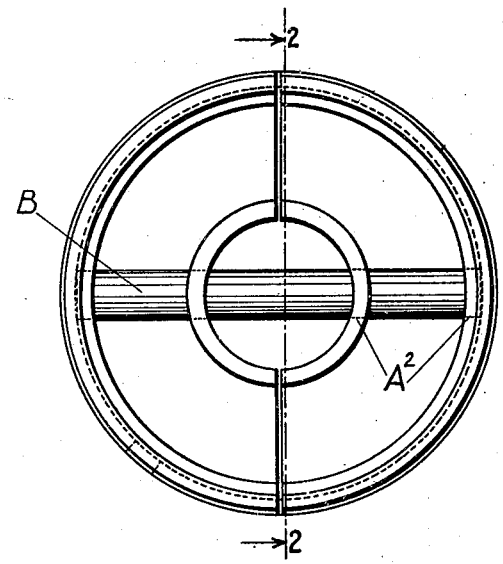
Fig. 3 is an elevation of the open side of our pulley.
Figure 2:
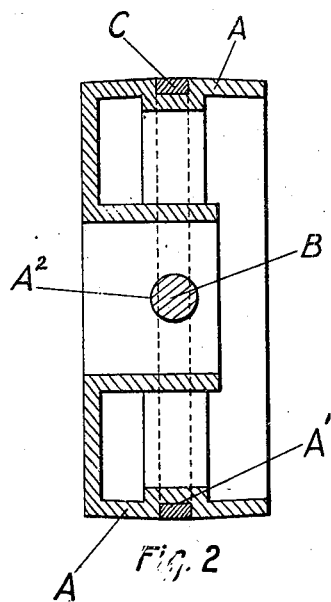
Fig. 2 is a section on the line 2 2 of Fig. 3.
Figure 1:
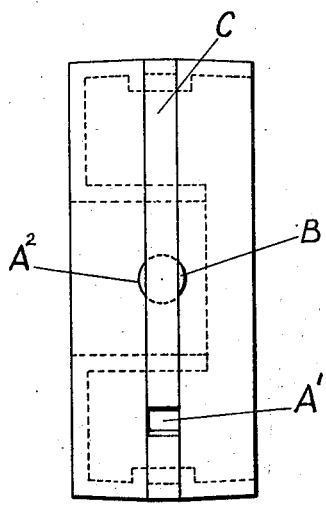

A A are sections of the pulley having the circumferential groove $A^1$ and the radial perforations $A^2$.

B is a pin adapted to lie in these perforations, and to secure the pulley to a shaft, and of such length that it extends from the bottom of the groove on one side to the bottom of the groove on the opposite side.

C is a spring lying in the groove and holding the pulley sections together. It also holds the pin B in place.

D is a shaft upon which the pulley is mounted.

E is a fan belt driven from D and driving in turn the fan pulley $E^1$, which is mounted on the fan shaft $E^2$.

F is the fan driven by the fan belt.

The use and operation of our invention are as follows:—

When it is desired to replace a pulley, as for example the belt pulley on the forward end of the crank shaft of the Ford car the two main members of the pulley are placed together about the crank shaft, the perforations in the pulley being in register with that of the shaft. The pin is then inserted so as to pin the parts together and to the shaft. The spring is then slipped on the outside of the pulley and into the groove holding the parts together, and securing the pin in place. The pulley is now ready for use.

In the particular form illustrated, the pulley in addition to serving as a driving pulley for the fan belt, serves also as a clutch member and is engaged by a clutch member on the starting crank. This clutch feature, however, is not essential to our pulley which may equally well be applied to any shaft where the use of such a pulley is an advantage, and we do not wish to be confined to the combination of a clutch and pulley.

It will be evident that while we have shown in our drawings an operative device, still many changes might be made both in size, shape and arrangement of parts without departing materially from the spirit of our invention, and we wish therefore that our drawings be regarded as in a sense diagrammatic.

We claim:—

1. A split pulley, a pin adapted to secure it to a shaft, a single means for holding the parts of said pulley together and for holding said pin in place.

2. A two part split pulley, a pin adapted to secure it to a shaft, a single means for holding the parts of said pulley together and for holding said pin in place.

3. A two part split pulley, a pin adapted to secure it to a shaft, a single means comprising a spring for holding the parts together and for holding said pin in place.

4. A two part split pulley, a pin adapted to secure it to a shaft, a single means comprising a spring encircling said pulley for holding the parts together and for holding said pin in place.

5. A split pulley, a pin adapted to secure it to a shaft, a single means comprising a spring for holding the parts together and for holding said pin in place.

6. A split pulley, a pin adapted to secure it to a shaft, a single means comprising a spring encircling said pulley for holding the parts together and for holding said pin in place.

7. A split pulley, a pin adapted to secure said pulley to a rotatable shaft and a spring adapted to hold the parts of said pulley together and to retain said pin in place.

8. A split pulley adapted to be mounted on a perforated shaft a pin adapted to secure said pulley to said shaft and a spring adapted to hold the parts of said pulley together and to retain said pin in place.

9. The combination of a perforated shaft with a split pulley adapted to be mounted on it, said pulley diametrically perforate and circumferentially grooved, a pin adapted to pass through said perforations and a spring to lie in said groove and to hold the parts of the pulley and said pin in place.

10. A combined pulley and clutch member comprising a cup shaped, diametrically perforate and circumferentially grooved split pulley, a perforated shaft which it surrounds, a transverse pin positioned within said perforations and a spring in said groove.

Signed at Hammond, Indiana, this 16th day of August, 1919.

GEO. E. ST. JOHN.
CLYDE BOWMAN.

Witnesses:
 DAN J. BROWN,
 WILLIAM C. ROSE.